United States Patent [19]
Giversen et al.

[11] Patent Number: 5,410,917
[45] Date of Patent: May 2, 1995

[54] OPTICAL FORCE SENSOR FOR HIGH DENSITY PLANAR ELECTRICAL INTERCONNECTS

[75] Inventors: Terri Giversen, Beverly, Mass.; Mark Stratton, Ottawa; Nile F. Hartman, Stone Mountain, Ga.

[73] Assignee: Digital Equipment Corporation, Maynard, Mass.

[21] Appl. No.: 86,527

[22] Filed: Jul. 1, 1993

[51] Int. Cl.⁶ .............................................. G01L 1/24
[52] U.S. Cl. ...................................... 73/800; 356/33; 356/34
[58] Field of Search ...................... 73/657, 705, 800; 356/33, 34, 35

[56] References Cited

U.S. PATENT DOCUMENTS

| | | | |
|---|---|---|---|
| 3,034,395 | 5/1962 | Zandman | 356/34 |
| 4,010,632 | 3/1977 | Slezinger et al. | 73/800 |
| 4,109,515 | 8/1978 | Swenson, Jr. | 356/34 |
| 4,195,929 | 4/1980 | Raftopoulos et al. | 73/800 |
| 4,320,966 | 3/1982 | Reytblatt | 356/34 |
| 4,789,236 | 12/1988 | Hodor et al. | 73/800 |
| 5,120,131 | 6/1992 | Lukosz | 356/351 |
| 5,177,555 | 1/1993 | Stratton et al. | 356/35.5 |

FOREIGN PATENT DOCUMENTS

| | | | |
|---|---|---|---|
| 744136 | 10/1966 | Canada | 73/800 |
| 805397 | 2/1969 | Canada | 73/800 |

Primary Examiner—Hezron E. Williams
Assistant Examiner—Daniel S. Larkin
Attorney, Agent, or Firm—Krishnendu Gupta; Ronald C. Hudgens; Arthur W. Fisher

[57] ABSTRACT

The present invention is a method and an apparatus for the precise quantitative measurement of the magnitude of force exerted at the points of contact on a high density electrical interconnect that quantitatively determines the magnitude of the force. The invention includes the steps of establishing a pressing relationship between a photoelastic material and the high density interconnect, coupling plane-polarized light into the photoelastic material stressed as a result of the pressing relationship with the high density interconnect, coupling of the polarized light being at 45 degrees with the direction of pressing, capturing an image of the fringe pattern of the plane polarized light exiting the stressed photoelastic material, the fringe pattern comprising of fringes wherein the number of fringes varies with the magnitude of the pressing force, and counting the number of fringes produced to determine the magnitude of force exerted on the photoelastic member.

9 Claims, 5 Drawing Sheets

OPTICAL FORCE SENSOR FOR HIGH DENSITY PLANAR ELECTRICAL INTERCONNECTS

BACKGROUND OF THE INVENTION

Various forms of planar electrical interconnects are used for computer and electrical systems. Typically these interconnects are characterized by large numbers of contact points with the contact resistance dependant on several factors including the applied normal force on the interconnect. Good electrical contact across a planar interconnect is critical to realizing high reliability from these designs and ensuring satisfactory overall electronic system performance. A measurement of the applied normal force distribution across an interconnect provides an excellent means for the determination of the quality and reliability of the contact at the interconnect surface. Optical techniques may be used for measuring these forces and offers the ability to easily characterize large high density interconnects.

U.S. Pat. No. 5,177,555 issued to Stratton et al. discloses a method and apparatus for optically determining a qualitative distribution of the normal force present at mating surfaces of an electrical surface connector. The Stratton patent uses photoelastic members that have plane-polarized, narrow wavelength light coupled into each member through optical fibers. The temporarily birefringent photoelastic material provides a relative propagation delay between vector components of the light in each member. The light exiting each member is input to a plane polarizer, and then fed through a series of fibers to an intensity meter. The relative delay between the vector components creates a detectable change in intensity at the intensity meter. The Stratton method produces a sinusoidal plot of intensity variation with pressure but due to fringe ambiguity does not tell exactly how much the exerted pressure is. The force distribution data obtained by using the Stratton technique is purely qualitative.

SUMMARY OF THE INVENTION

The present invention is a method and an apparatus for the measurement of the magnitude of force exerted at the points of contact on a high density electrical interconnect that quantitatively determines the magnitude of the force.

An object of the invention is a method and apparatus for precise quantitative measurement of the magnitude of the force exerted at the points of contact on a high density electrical interconnect.

This and other objects are attained, in a broad sense, through the use of various features of the invention. The invention includes the steps of establishing a pressing relationship between a photoelastic material and the high density interconnect, coupling plane-polarized light into the photoelastic material stressed as a result of the pressing relationship with the high density interconnect, coupling of the polarized light being at 45 degrees with the direction of pressing, capturing an image of the fringe pattern of the plane polarized light exiting the stressed photoelastic material, the fringe pattern comprising of fringes wherein the number of fringes varies with the magnitude of the pressing force, and counting the number of fringes produced to determine the magnitude of force exerted on the photoelastic member.

In a narrower sense the objects of the invention is attained by the use of a coating of photoelastic material over the surface of the interconnect to act as an optical waveguide to view the refringence pattern.

In yet another narrow sense the objects of the invention is attained by the use of a reflection technique in order to eliminate the backside. The invention includes positioning a photoelastic material in touching relationship with the points of contact of the interconnect, the photoelastic element having a coating of metal on a surface touching the points of contact of the high density interconnect and on a surface opposite to the touching surface, the photoelastic element further having a coating of metal on a surface opposite the surface through which polarized light is coupled to the photoelastic member, wherein the polarized light coupled into the photoelastic member is reflected back by the metal coating and exits the stressed photoelastic material through the same surface of the photoelastic material as the surface through which the polarized light enters the photoelastic member.

It is an advantage of this invention that precise quantitative measurements can be made of the magnitude of the force exerted at points of contact on a high density electrical interconnect.

The foregoing and additional objects, features and advantages of the present invention will become apparent to those skilled in the art from a more detailed consideration of the preferred embodiment thereof, taken in conjunction with the accompanying drawings.

DETAILED DESCRIPTION OF THE INVENTION

Photoelastic materials subjected to compressive forces or stress are no longer isotropic but exhibit birefringence. Pressure applied to a photoelastic polymer alters the material refractive index for light propagating perpendicular to the applied force direction and polarized in directions parallel and perpendicular to the strain direction. The refractive index difference between the two orthogonal polarization components, defined as birefringence, is proportional to the applied pressure. In the case of high density interconnects, counting the number of fringes produced by the stress induced birefringence provides a method of characterizing the applied force distribution across an interconnect.

Figure 1:
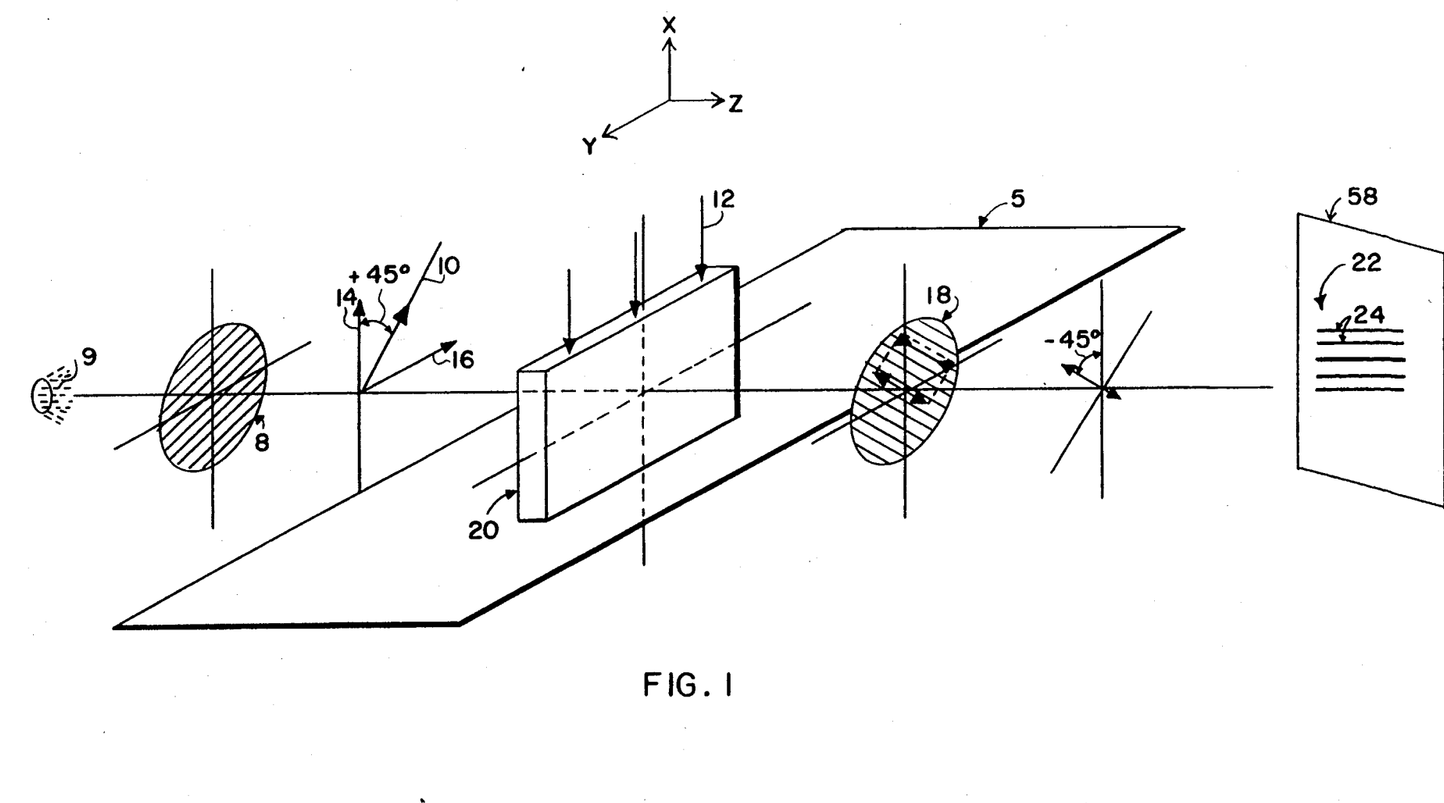
FIG. 1 is a simplified showing of an optical force measurement arrangement based on analysis of stress induced birefringence in a photoelastomer according to the principles of the invention.

A simplified showing of an optical force measurement arrangement for the measurement of the magnitude of force exerted at points of contact of a high density electrical interconnect is shown in FIG. 1. As illustrated in FIG. 1, polarizer 8 is used to generate linearly polarized light 10 from an input illumination source 9. The polarizer 8 filters the light from the illumination source 9 so that only vibrations parallel to the axis of polarization of the polarizer 8 is allowed to pass through. The resultant linearly polarized light 10 is introduced into a photoelastic material 20 that is positioned in touching relationship with a high density interconnect 5. The photoelastic material 20 is pressed, as shown in FIG. 1, in the x-direction, against the interconnect 5 to induce stress therein. The linearly polarized light 10 is introduced to the photoelastic material 20 at 45° to the direction 12 of the pressing force.

On entering the stressed photoelastic material 20, the linearly polarized light 10 can be considered to be composed of two orthogonally polarized beams 14 and 16, one parallel to and the other perpendicular to the force direction. The orthogonally polarized beams 14 and 16 vibrate in the two perpendicular planes of principle stress. One of these planes coincides with the plane of maximum stress, and the other with the plane of minimum stress. The stress induced birefringence or more appropriately the difference in refractive index introduces differing phase shifts into the two orthogonally polarized beam components. Consequently, the two rays emerge from the photoelastic material 20 out of phase with each other.

By appropriately recombining the two orthogonally polarized components, the relative phase difference can be detected through interference effects. Recombination requires the use of an analyzer 18 normally rotated 90° to the input beam polarization direction. The analyzer 18 transmits the components of the two orthogonal beams that are parallel to the polarization direction of the analyzer 18 and blocks the components perpendicular to the polarization direction of the analyzer 18. The transmitted components add constructively or destructively depending on the relative phase difference. By deducing the relative retardation between the emerging rays it is possible to evaluate the difference between the two principal stresses within the photoelastic element 20.

By gradually increasing the force exerted on the photoelastic member 20 and hence the high density interconnect 5, the relative retardation between the emerging rays increases, and the phase difference between the two emerging components changes accordingly. There exists certain magnitudes of force at which the two components emerging from the analyzer 18 are exactly in phase with each other. This results in the components reinforcing one another to give a maximum light intensity. There also exists certain magnitudes of force at which the two components emerging from the analyzer 18 are exactly half a wavelength out of phase with each other. This results in the components cancelling one another to give a minimum light intensity by causing extinction of light.

In general, because the force exerted at any point on the photoelastic member 20 varies from point to point, the output from the analyzer comprises black and monochromatic bands. Each band, termed a fringe, 24 represents the contour of constant principle stress difference. The optical output is a fringe pattern 22 with the number of fringes 24 in the pattern being proportional to the applied force. The fringe pattern 22 may be observed by projecting the pattern on a screen 58 or by other means, such as capturing the image using a CCD camera. The fringe pattern may also be electronically stored and processed using electronic image processing algorithms to count the number of fringes for determination of the magnitude of applied force. Knowing the wavelength of the light source 9, the relative retardation can be calculated, and this can be interpreted to the difference in principle stresses and hence the applied force magnitude if the stress-optical sensitivity of the model material is known.

In a photoelastic material, the real part of the dielectric constant or index of refraction is the physical quantity that changes with the application of strain or stress. In practice, the photoelastic material acts as a linear retardation plate that introduces a difference in transit time or a relative phase retardation ($\delta$) into one of the two orthogonal polarized light components traveling through the medium. The two orthogonal polarization components are realized by orienting a linearly polarized input beam at 45° to the applied force. In the case illustrated in FIG. 1, where force is applied as a uniaxial stress along the x direction and light propagates in the z direction, the retardation ($\delta$) is given by the following formula;

$$\delta = (2LC_{9\sigma}/\lambda)(\sigma_x) = (2\pi LC_\epsilon/\lambda)(\epsilon_x). \qquad \text{Eqn. 1}$$

where
$C_\sigma$ = stress optic coefficient,
$C_\epsilon$ = strain optic coefficient,
L = optical pathlength,
$\sigma_x$ = uniaxial stress
$\epsilon_x$ = uniaxial strain and
$\lambda$ = optical wavelength. In instances where differential stress is applied (along both x and y), $\sigma_x$ is replaced by $\Delta\sigma = \sigma_x - \sigma_y$ by $\Delta\epsilon = \epsilon_x - \epsilon_y$.

For a compressive stress along the x axis, the case assumed for high density electrical interconnects, the optical intensity transmitted by the analyzer is described by the following equation:

$$I = I_0/4 \,[1 - \cos(\delta)] \, I = I_0/4 \,[1\, \cos((2\pi LC_\sigma/\lambda)(\sigma_x))] \qquad \text{Eqn. 2}$$

$\sigma_x$ in this equation is proportional to the applied force. For a uniform compressive stress along the x axis, the resulting optical signal exhibits a fringe pattern with the number of fringes being proportional to the applied force. The pressing force corresponding to a given number of fringes can be calculated using equations 1 & 2 above using the stress and strain optic coefficients ($C_\sigma$ = stress optic coefficient, $C_\epsilon$ = strain optic coefficient) for the photoelastic material 20.

However for many photoelastic materials the stress and strain optic coefficients are not available. When using such materials a calibration approach may be used to quantitatively determine the magnitude of force. The calibration approach comprises of using a known force to stress the photoelastic member to produce a fringe pattern and counting the number of resulting fringes. Using this information subsequent fringe patterns may be analyzed to predict the magnitude of force causing such fringe patterns. The advantage of using the calibration approach is that it takes into account geometrical factors such as the size of the contact area, and other geometrical factors while calculating the magnitude of force.

The configuration illustrated in FIG. 1, represents broadly the method for force measurement at points of contacts of high density electrical interconnects. Configurations illustrated in FIGS. 2 and 3 are more specific methods of force measurement at points of contacts of high density electrical interconnects using the principles of FIG. 1.

Figure 2:
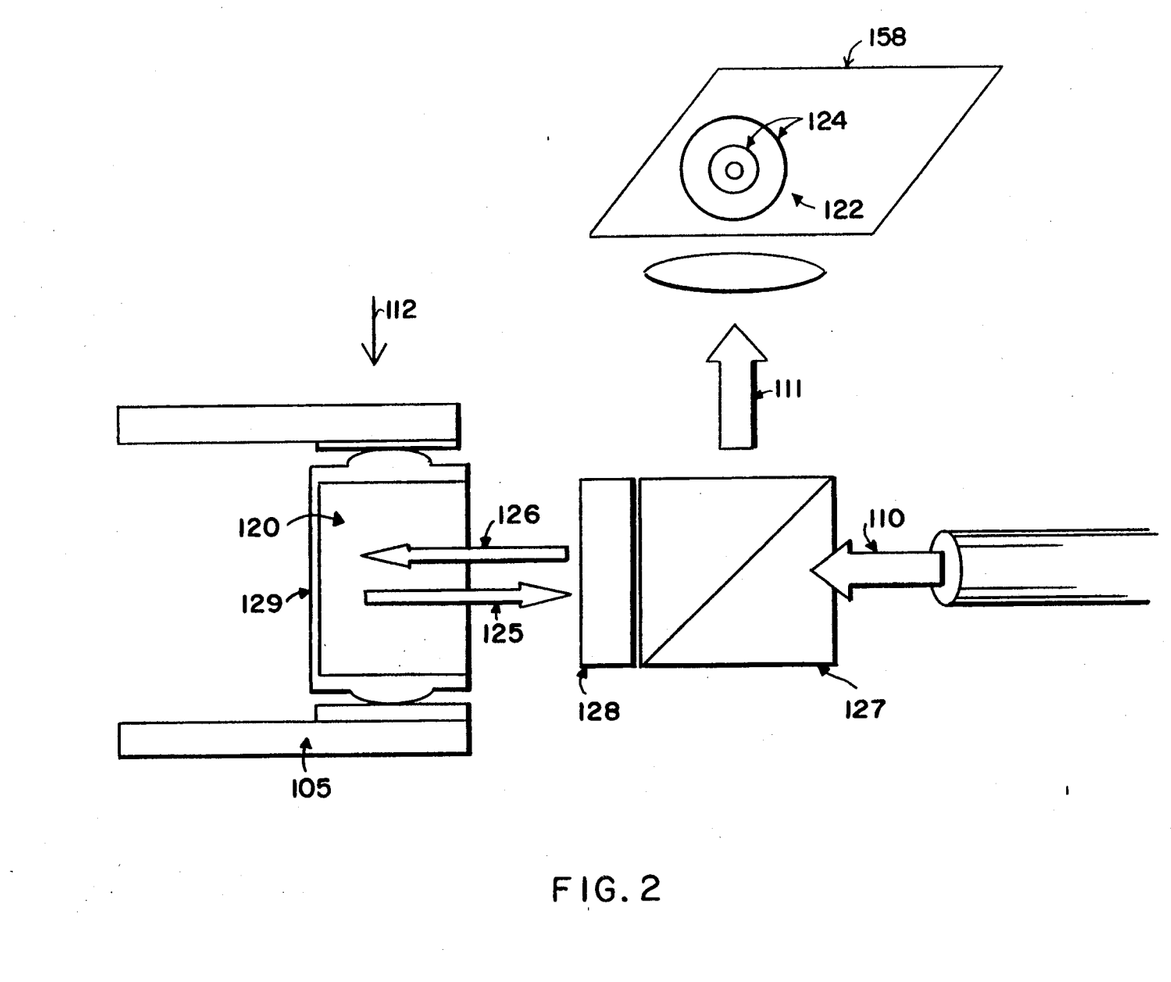
FIG. 2 illustrates a technique of optical force measurement relying on reflected circularly polarized light according to the principles of the invention.
Figures 3, 3A:
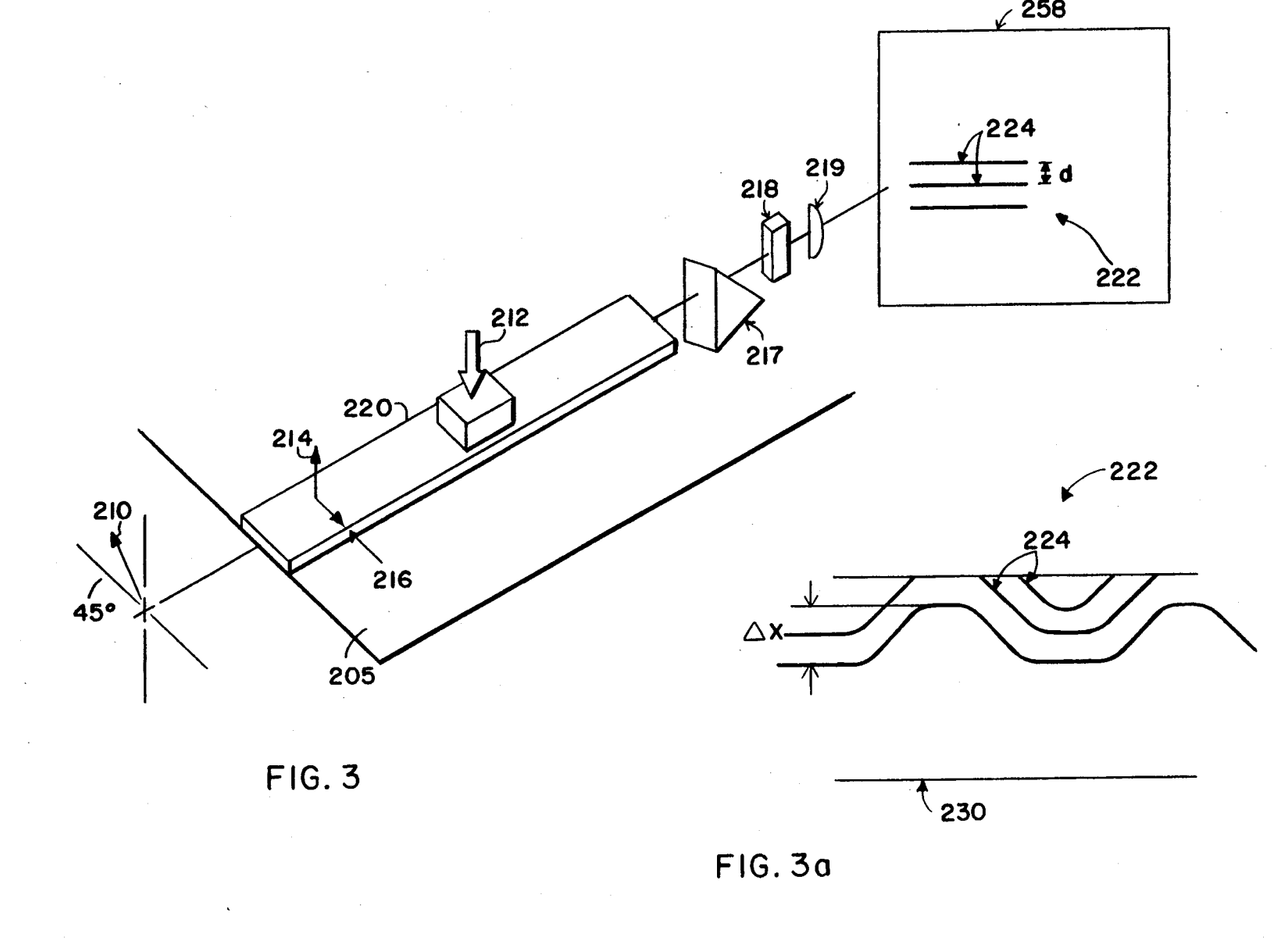
FIG. 3 illustrates a technique of optical force measurement using an optical waveguide according to the principles of the invention.
FIG. 3a illustrates fringe patterns obtained by using the technique of optical force measurement illustrated in FIG. 3.

The approach illustrated in FIG. 2 is functionally the same as FIG. 1, the difference being that reflected light, rather than transmitted light, is utilized. As shown in FIG. 2, this configuration uses circularly polarized light 126 and a polarizing beam splitter 127 to separate the reflected component 125 from the incident circularly polarized light 126.

As shown in FIG. 2 a quarter wave plate 128 converts linearly polarized light 110 to circularly polarized light 126. Circularly polarized light 126 may be physically described by a vector indicating direction of polarization at any instant in time that rotates as the optical beam travels along the direction of propagation. The circularly polarized light 126 is introduced to a photoelastic material 120 that is positioned in force transferring relationship with a high density interconnect 105. The photoelastic material 120 has a metal coating 129 on the side opposite to the side from which the circularly polarized light 126 is introduced. The photoelastic material 120 is pressed against the interconnect 105 to induce stress in the photoelastic material 120. Upon reflection from the metallized surface 129, the sense of rotation of the incident circularly polarized light 126 is reversed creating reflected circularly polarized light 125. Furthermore, with transmission of the reflected beam 126 through the quarter waveplate 128, the circularly polarized light 125 is now converted to linearly polarized light 111 by the polarizing beam splitter 127 that is rotated 90° with respect to the original linearly polarized input beam 110. This permits separation of the incident and reflected linearly polarized beams, 110 and 111 respectively, for stress analysis while measurement sensitivity is improved by this method as well because it is a double pass device. The reflected optical beam 111 is then transmitted onto a screen 158 for observation of the resultant fringe pattern 122.

As shown in FIG. 2, when force 112 is applied on the photoelastic sensing element 120 birefringence is introduced causing an interference fringe pattern 122 to be produced on the screen 158. By scanning across each fringe pattern 122 and counting the number of fringes 124 the magnitude of force 112 exerted on the interconnect 105 may be determined. The fringe pattern 122 may also be captured on photographic paper using a CCD camera for analysis to determine the number of fringes and hence the magnitude of the applied force.

The method illustrated in FIG. 3 and 3a utilizes an optical waveguide 220 as the sensing medium. The waveguide may be a photofabricated planar structure or a standard cylindrical fiber fabricated from a birefringent material. The basic operation is identical to the previous description of the method of FIG. 1 except that a waveguide is used. Linearly polarized light 210 is introduced to the photoelastic waveguide 220 that is positioned in touching relationship with a high density interconnect 205. The photoelastic waveguide 220 is pressed against the interconnect 205 to induce stress in the photoelastic material 220. The linearly polarized light 210 is introduced to the photoelastic material 220 at 45° to the direction 212 of the pressing force to provide orthogonally polarized guided beams, noted as TE and TM guided waves 214 and 216. Pressure is applied to the photoelastic material 220 in the x-direction 212. The stress induced birefringence or more appropriately the difference in refractive index introduces differing phase shifts into the two orthogonally polarized beam components 214 and 216. By appropriately recombining the two orthogonally polarized components, the relative phase difference can be detected through interference effects.

As shown in FIG. 3 and 3a, an interference pattern is generated between the TE 214 and TM 216 guided waves. The TE 214 and TM 216 guided waves are coupled out from the waveguide 220 using a birefringent prism 217. A polarization sensitive grating coupler may be used instead for the birefringent prism 217 to get the same result. Due to birefringence, the TE 214 and TM 216 waves become angularly separated. As shown in FIG. 3, recombination requires the use of a cylindrical lens 219 and an analyzer 218 normally rotated 90° to the input beam polarization direction. The analyzer 218 transmits and recombines the components 214 and 216 of the two orthogonal beams that are parallel to the polarization direction of the analyzer 218 and blocks the components perpendicular to the polarization direction of the analyzer 218. The transmitted components add constructively or destructively depending on the relative phase difference. The optical output is a fringe pattern 222 with the number of fringes 224 in the pattern being proportional to the applied force. The fringe pattern 222 may be observed by projecting the pattern on a screen 258 or by capturing the image using a CCD camera. The fringe pattern may also be electronically stored and processed using electronic image processing algorithms to count the number of fringes for determination of the magnitude of applied force.

As shown in FIGS. 3 and 3a, the fringe pattern 222 has a fringe period, d, as defined by the equation:

$d = \lambda/2 \sin(\theta/2)$, where $d$ = the fringe period, $\lambda$ = the source wavelength, and $\theta$ = the angular separation between the TE and TM modes.

FIG. 3, shows the fringe pattern 222 observed when no force is applied to the photoelastic material 220. However, when force is applied to the photoelastic material 220, the induced birefringence causes a change in fringe position, $\Delta x$, as shown in FIG. 3a. The displacement, $\Delta x$, is measured to determine the magnitude of the applied force, $f_d$, according to the following equation:

$f_d = (\Delta x/d) A$, where, $f_d$ = the magnitude of force at location 230, $\Delta x$ = fringe displacement, $d$ = fringe period, and $A$ = calibration constant.

Figure 4:
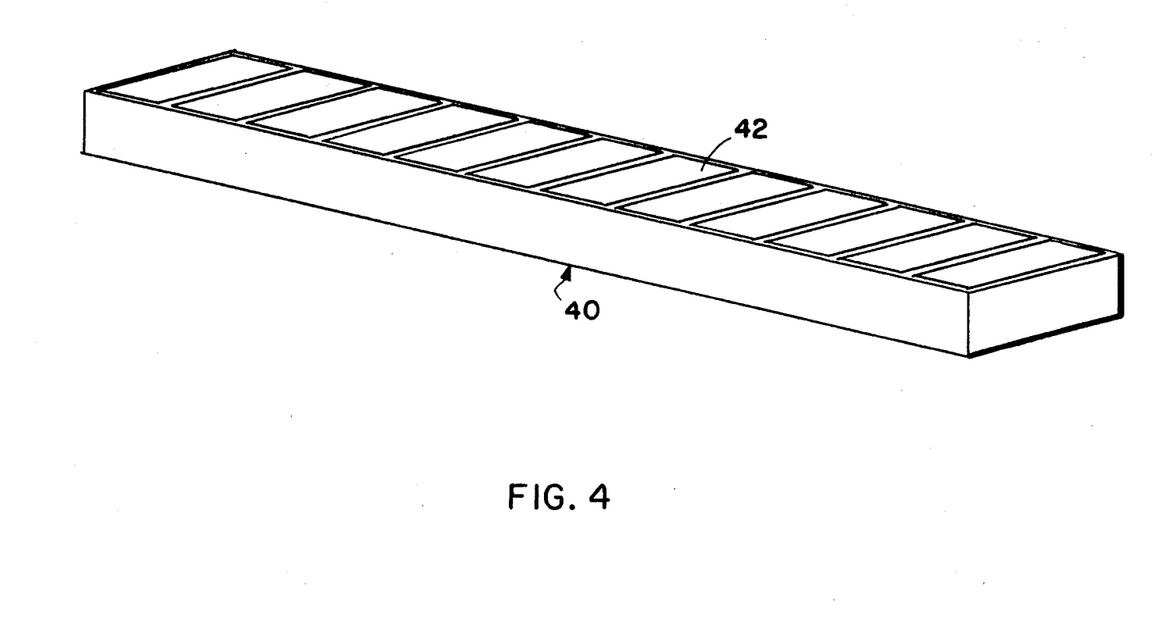
FIG. 4 is a perspective view of a photoelastic sensing element having metal contact pads.
Figure 5:
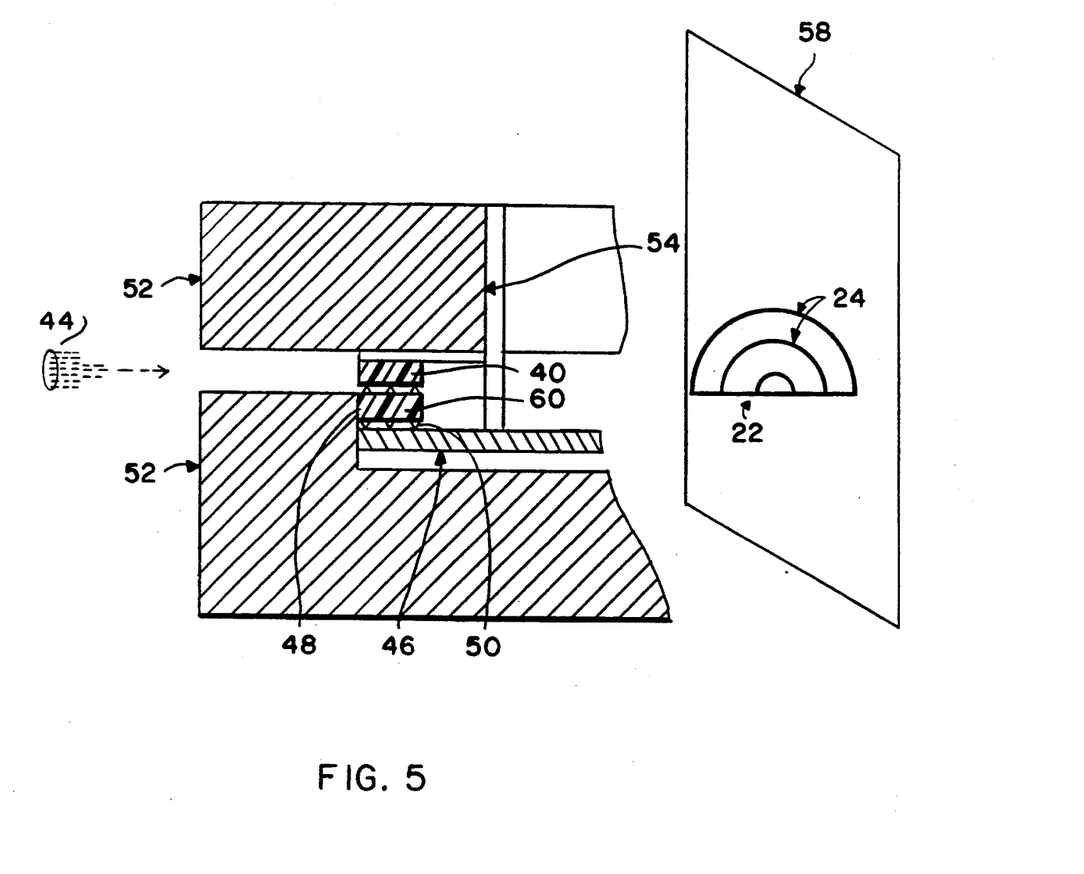
FIG. 5 is a cross-section view of the apparatus used for optical force measurement based on analysis of stress induced birefringence in a photoelastomer according to the principles of the invention.
Figure 5A:
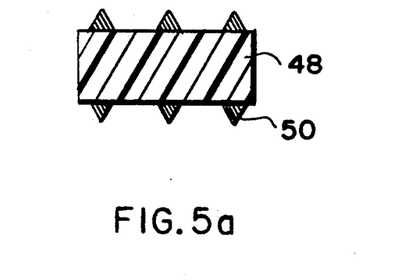
FIG. 5a is an exploded cross-section view of the connector used with the apparatus for optical force measurement based on analysis of stress induced birefringence in a photoelastomer according to the principles of the invention.

FIGS. 4, 5, and 5a show an apparatus for the measurement of force at a high density electrical interconnect according to the principles of the method of FIG. 1. FIG. 4 shows a photoelastic member 40. An ultra violet hardenable material manufactured by Norland, Inc. (NOA 61) was used as the photoelastic member 40. The NOA 61 material used in this embodiment has the following properties:

| Viscosity | 300 cps |
| --- | --- |
| Modulus of elasticity | 150,000 |
| Shore D hardness | 85 |
| Refractive Index | 1.56 |

Other materials that exhibit good optical transparency, have the ability to be cast at low temperatures with moderate UV exposure and exhibit high sensitivity for stress sensing may be used instead.

The photoelastic member 40 of FIG. 4 is fabricated by molding NOA 61a in a shaping mold formed from optically polished BK-7 glass. The photoelastic member is then photo-hardened by exposure to 500 to 1000 millijoules/cm$^2$ of long wavelength UV source such as a high pressure mercury lamp, filtered to remove short wavelength UV. The use of BK-7 glass allows the photohardened photoelastic member to be easily separated from the mold leaving an optically smooth surface on the photoelastic member 40.

As shown in FIG. 4, the photoelastic member 40 has metal pads 42 bonded to it. The metal pads 42 are made of stainless steel and are used to distribute the applied force over the entire surface of the pads 42. Further, using the metal pads 42 protects the photoelastic member 40 from physical damage due to repeated applications of force directly on to its surface. However it is not essential that the metal pads 42 be used. Good results have also been obtained by using photoelastic sensing elements 40 without metal pads bonded to them.

FIG. 5 shows an apparatus for the measurement of force at a high density electrical interconnect using the photoelastic member 40 of FIG. 4. The apparatus comprises a high density interconnect board 46 that has a pin connector 48 mounted on it. As shown in FIG. 5a, the pin connector 48 has a plastic body 60 and has gold pins 50 that extend through the body. As shown in FIG. 5a the pin connector 48 comprises rows of pins. The pin connector 48 is positioned on the high density electrical interconnect 46 such that the pins 50 of the connector make contact with the points of contact of the interconnect 46 on one end. As shown in FIGS. 5 and 5a a photoelastic sensing element 40 is placed over the pin connector 48 such that each row of pins 50 make contact with a pad 42 on the photoelastic sensing element 40. The pin connector 48 acts as a force transfer device between the points of contact of the interconnect 46 and the photoelastic sensing element 40 placed over it.

As shown in FIG. 5, placed around the photoelastic sensing element 40, pin connector 48, and high density interconnect board 46 is a clamping frame 52. The clamping frame 52 allows variable force to be applied to the photoelastic sensing element 40 in order to the determine the effect on the fringe patterns produced by applying different magnitudes of force on the points of contact of the high density interconnect board 46.

As shown in FIG. 5, laser source 44 is used as the source of linearly polarized light. Good results have been obtained by using a linearly polarized 1 mw HeNe laser as the laser source. The polarization axis of the laser source is oriented at 45° with respect to the direction of the applied force on the member 40. As shown in FIG. 5, the linearly polarized laser source 44 is incident on the photoelastic sensing element 40 from the left.

The clamping frame 52 is used to exert pressure on the photoelastic sensing element 40 to induce birefringence according to the principles of the method of FIG. 1. The optical beam that is transmitted through the birefringent photoelastic sensing medium 40 is made to pass through a polarizer 54 as shown in FIG. 5 and is then transmitted onto a screen 58 for observation of the resultant fringe pattern 22.

When no stress is applied to the photoelastic sensing element 40 the screen is uniformly dark with no fringe patterns visible. However as force is applied to the photoelastic sensing element 40 and the high density interconnect 46 by tightening the clamping frame 52 an interference fringe pattern 22 is produced on the screen 58. Each pad 42 of the sensing element 40 produces a fringe pattern 22. By suitably spacing the pads 42 the resultant fringe patterns 22 from each may also be separated to prevent overlap. By scanning across each fringe pattern 22 and counting the number of fringes 24 the magnitude of force exerted on each row of pins 50 of the pin connector 48 may be determined.

The fringe pattern 22 may also be captured on photographic paper using a CCD camera for analysis to determine the number of fringes and hence the magnitude of the applied force. The fringe pattern 22 may also be digitized and stored as a digital image and using image processing algorithms the digital image can be analyzed to count the number of fringes and hence the magnitude of the applied force.

We claim:

1. A method of determining the magnitude of force exerted on a high density planar interconnect at points of contact comprising:

establishing a pressing relationship between a photoelastic material and the high density interconnect by positioning a photoelastic material in a force transferring relationship with the points of contact of the interconnect, the photoelastic material having a coating of metal on a surface touching the points of contact of the high density interconnect and on a surface opposite to the touching surface, the photoelastic material further having a coating of metal on a surface opposite the surface through which polarized light is coupled to the photoelastic material, wherein the polarized light coupled into the photoelastic material is reflected back by the metal coating and exits the stressed photoelastic material through the same surface of the photoelastic material as the surface through which the polarized light enters the photoelastic material;

coupling polarized light into the photoelastic material stressed as a result of the pressing relationship with the high density interconnect, coupling of the polarized light being at 45 degrees with the direction of pressing;

capturing an image of the fringe pattern of the plane polarized light exiting the stressed photoelastic material, the fringe pattern comprising of fringes wherein the number of fringes varies with the magnitude of the pressing force;

counting the number of fringes produced to determine the magnitude of force exerted on the photoelastic material.

2. The method of claim 1 wherein the polarized light is circularly polarized light.

3. The method of claim 1 comprising capturing the image of the fringe pattern by forming a visual image.

4. The method of claim 1 wherein the polarized light coupled into the photoelastic material is plane-polarized light.

5. A method of determining the magnitude of force exerted on a high density planar interconnect at points of contact comprising:
- positioning a connector in touching relationship with the points of contact of the interconnect, the connector having a body, the connector having pins running through the body and exiting on opposite sides of the body, the pins on one side of the connector being in touching relationship with points of contact of the interconnect;
- positioning a member of photoelastic material in touching relationship with the connector on the opposite side of the connector from the interconnect;
- pressing the member of photoelastic material against the interconnect to induce stress in the photoelastic material;
- coupling plane-polarized light into the stressed photoelastic member at 45 degrees with the direction of pressing;
- capturing an image of the fringe pattern of the plane polarized light exiting the stressed photoelastic material so that magnitude of the pressing force can be determined from the number of fringes in the fringe pattern.

6. The method of claim 5 comprising capturing the image of the fringe pattern by forming a visual image.

7. The method of claim 5 further comprising the step of counting the number of fringes produced to calculate the magnitude of force exerted on the photoelastic member.

8. An apparatus for determining the magnitude of force exerted on a high density planar interconnect at points of contact comprising:
- a member of photoelastic material in pressing relationship with the interconnect the photoelastic material having a coating of metal on a surface touching the points of contact of the high density interconnect and on a surface opposite to the touching surface, the photoelastic material further having a coating of metal on a surface opposite the surface through which polarized light is coupled to the photoelastic material, wherein the polarized light coupled into the photoelastic material is reflected back by the metal coating and exits the stressed photoelastic material through the same surface of the photoelastic material as the surface through which the polarized light enters the photoelastic material;
- a device for pressing the member of photoelastic material against the interconnect to induce stress in the photoelastic material;
- a device for coupling plane-polarized light into the stressed photoelastic member at 45 degrees with the direction of pressing;
- a device for capturing an image of the fringe pattern of the plane polarized light exiting the stressed photoelastic material so that magnitude of the pressing force can be determined from the number of fringes in the fringe pattern.

9. An apparatus for determining the magnitude of force exerted on a high density planar interconnect at points of contact comprising:
- a connector, the connector having a body, the connector having pins running through the body and exiting on opposite sides of the body, the pins on one side of the connector being in touching relationship with points of contact of the interconnect;
- a member of photoelastic material in touching relationship with the the pins on the side of the connector opposite to the pins in touching relationship with points of contact of the interconnect;
- a device for pressing the member of photoelastic material against the interconnect to induce stress in the photoelastic material;
- a device for coupling plane-polarized light into the stressed photoelastic member at 45 degrees with the direction of pressing;
- a device for capturing an image of the fringe pattern of the plane polarized light exiting the stressed photoelastic material so that magnitude of the pressing force can be determined from the number of fringes in the fringe pattern.

* * * * *